(12) United States Patent
Wheatley

(10) Patent No.: US 8,191,852 B1
(45) Date of Patent: Jun. 5, 2012

(54) TACKY BLOCK AND METHOD FOR ELEVATING LAPTOPS

(75) Inventor: Alan J. Wheatley, Draper, UT (US)

(73) Assignee: American Covers, Inc., Bluffdale, UT (US)

( * ) Notice: Subject to any disclaimer, the term of this patent is extended or adjusted under 35 U.S.C. 154(b) by 400 days.

(21) Appl. No.: 12/341,552

(22) Filed: Dec. 22, 2008

Related U.S. Application Data

(60) Provisional application No. 61/009,765, filed on Dec. 31, 2007.

(51) Int. Cl.
*F16M 1/00* (2006.01)
(52) U.S. Cl. .................. 248/677; 248/188.2; 248/188.8
(58) Field of Classification Search .................. 248/677, 248/188.8, 188.9, 188.1, 188.2
See application file for complete search history.

(56) References Cited

U.S. PATENT DOCUMENTS

| | | | |
|---|---|---|---|
| 6,979,778 B2 * | 12/2005 | Xiong et al. ..................... 174/50 |
| 7,137,570 B2 | 11/2006 | Wheatley et al. | |
| 7,234,199 B2 * | 6/2007 | Bushey .......................... 16/42 R |
| 7,234,200 B2 * | 6/2007 | Chase ............................ 16/42 R |
| 7,293,719 B2 * | 11/2007 | Wheatley et al. ............... 239/56 |
| 7,363,666 B2 * | 4/2008 | Polevoy et al. .................... 5/311 |
| 7,442,161 B2 * | 10/2008 | Gainer ............................ 353/70 |
| 7,784,752 B2 * | 8/2010 | Tang ........................... 248/188.8 |
| 2006/0038095 A1 * | 2/2006 | Deaner ........................ 248/188.9 |
| 2008/0191106 A1 * | 8/2008 | Shiffler et al. ............. 248/188.9 |
| 2008/0251663 A1 * | 10/2008 | Tracy et al. ................. 248/188.8 |

\* cited by examiner

*Primary Examiner* — Ramon Ramirez
(74) *Attorney, Agent, or Firm* — Thorpe North & Western LLP

(57) ABSTRACT

A system and method for elevating a portion of a laptop relative to a support surface to improve underbody ventilation by obtaining one or more removable blocks having a tacky surface on one face of the block, removably adhering the tacky surface to either the laptop support surface or the underside of the laptop, and positioning the laptop on the support surface such that the removable block elevates a portion of the laptop above the support surface.

31 Claims, 2 Drawing Sheets

TACKY BLOCK AND METHOD FOR ELEVATING LAPTOPS

CLAIM OF PRIORITY

Priority of U.S. Provisional Patent Application Ser. No. 61/009,765, filed on Dec. 31, 2007, is claimed.

FIELD OF THE INVENTION

The field of the invention relates generally to accessory devices for computers, and more specifically to a method and device for elevating a laptop computer to improve underbody ventilation.

BACKGROUND OF THE INVENTION AND RELATED ART

With the ever-increasing speed and performance demands on laptop computers, the microprocessor and other components inside the laptop can operate continuously at high temperatures and generate significant amounts of heat. The battery can produce considerable heat during repeated cycles of use and charging that can severely impact both the performance and longevity of the battery and the other components. Keeping the laptop cool, therefore, is a principal concern in extending both the life of the battery and the other electronic components. An internal fan with side duct or bottom openings can be used to cool many of the electronics. Because of its relative size and weight, however, the battery is often isolated from the rest of the operating components in a secondary compartment accessed from the bottom of the laptop, and is thus only exposed to secondary cooling effects.

Due to the fast-approaching ubiquitous nature of laptops, the portable computing devices are often used in environments and manners not anticipated by the designers. For instance, some laptop configurations have bottom cooling vents that require short, permanently-mounted stubs that lift the laptop off a hard support surface to allow cool air to enter and hot air to escape. It is not uncommon, however, to place laptops on soft surfaces such beds, pillows, couches or carpeted floors, such that the stubs sink into the surface and the cooling vents become completely blocked. Even laptops with side vents are not immune to the problem of having the bottom and sides of the laptop completely surrounded by a compliant surface which blocks airflow into and out of the device.

SUMMARY OF THE INVENTION

In light of the problems and deficiencies inherent in the prior art, the present invention seeks to overcome these by a method for elevating at least a portion of a laptop relative to a support surface to improve underbody ventilation. The method comprises obtaining one or more removable blocks having a tacky surface on one face of the block; removably adhering the tacky surface to either the laptop support surface or the underside of the laptop; and positioning the laptop on the support surface such that the removable block elevates a portion of the laptop above the support surface.

The method further includes obtaining a pair of two removable tacky blocks, where each removable block has a tacky surface that can be removably attached to the tacky surface of the other block to mutually cover and protect the tacky surfaces during storage and transportation. The method further includes removably attaching the pair of tacky blocks to each other to form a single object, such as a sphere, that can be used for other purposes, such as a decoration, toy, exercise device or promotional object.

In addition, the invention provides a method for elevating at least a portion of a laptop relative to a support surface to improve underbody ventilation comprising obtaining a pair of removable blocks. The blocks are removably attached to each other to form a single object. Each block has at least one tacky surface removably attached to the tacky surface of the other block to substantially mutually cover the tacky surfaces. The method further includes separating the pair of removably blocks from one another. The method further includes removably adhering the at least one tacky surface of each block to the support surface or an underside of the laptop. The method further includes positioning the laptop on the support surface, such that the pair of removable blocks elevate the at least a portion of the laptop above the support surface.

Furthermore, the invention provides a system for elevating at least a portion of a laptop relative to a support surface to improve underbody ventilation. The system includes a pair of removable blocks each having at least one tacky surface. The pair of blocks has at least two configurations, including a stored configuration and a use configuration. In the stored configuration, the pair of blocks are attached to each other to form a single object with the at least one tacky surface of each block removably attached to the tacky surface of the other block to substantially mutually cover the tacky surfaces. In the use configuration, the pair of blocks are separated from one another and the at least one tacky surface of each block is removably attached to the support surface or an underside of the laptop such that the pair of removable blocks elevate the at least a portion of the laptop above the support surface

BRIEF DESCRIPTION OF THE DRAWINGS

Features and advantages of the invention will be apparent from the detailed description that follows, and which taken in conjunction with the accompanying drawings, together illustrate features of the invention. It is understood that these drawings merely depict exemplary embodiments of the present invention and are not, therefore, to be considered limiting of its scope. And furthermore, it will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings, in which.

DETAILED DESCRIPTION OF EXEMPLARY EMBODIMENTS

Figure 1:
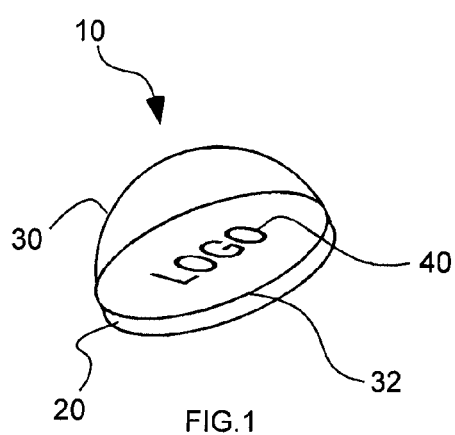
FIG. 1 is a perspective view of a tacky block in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Illustrated in FIGS. 1-12 are various exemplary embodiments of a Tacky Block for Elevating Laptops that can be used to improve the cooling of a portable laptop computer. The tacky block enhances the cooling by elevating a portion of the laptop to create a wider gap between the underside of the laptop and the support surface that promotes airflow beneath the computer. The tacky block of the present invention offers an additional benefit in that the tacky surface securely adheres the block to either the laptop itself or to the flat support surface upon which the laptop rests, according to user preference and according to whether the support surface is hard and flat, or soft, flexible or irregular. In any situation, the tacky block of the present invention can lead to a more secure and stable connection between the laptop and the support surface that resists sliding, tipping or other relative movement which might de-stabilize the laptop and allow it to impact the support surface, or to altogether fall off the table, desk, bed, countertop or other item of furniture upon which it is placed. The present invention is further advantageous in that the tacky block can elevate the back portion of the laptop to give the keyboard a forward slope, which can be more comfortable and ergonomically pleasing to some users. Additionally, the tacky block of the present invention can also uniformly lift the entire laptop above the support surface to place the keyboard at a more convenient height.

Illustrated in FIG. 1 is a perspective view of a tacky block, indicated generally at 10, in accordance with one embodiment of the present invention. The tacky block 10 can include a base or grip portion 20, and an upper body portion 30. The base portion 20 can be disposed on a contact surface, while the body portion can provide the structural support for the laptop. The base portion and upper body portions can be made from different materials, and can be separated by an interface 32. The upper body can be made substantially optically transparent, such that a user can look through the upper body material to see the interface. An internal graphic or indicia 40, such as a corporate logo, can be positioned at the interface such that the indicia is visible through the transparent upper body portion of the tacky block.

Figure 2:
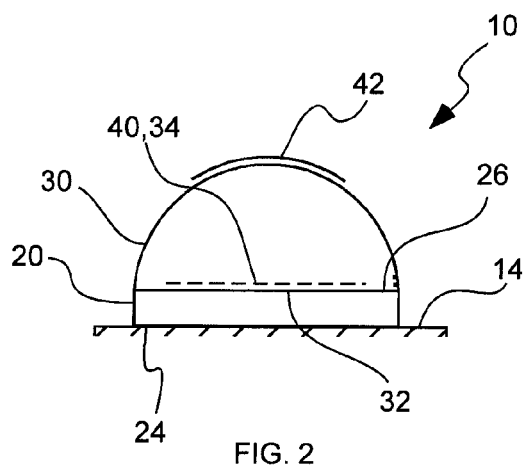
FIG. 2 is a side view of the tacky block of FIG. 1.

Referring to FIG. 2, the tacky block 10 or base portion 20 has an adhesion surface 24 that is disposed on and grips a contact surface 14. The contact surface 14 can be either a flat support surface or the underside of the laptop itself. The adhesion surface can be "tacky", such that the tacky block or adhesion surface tends to cling to the contact surface in a mechanical fashion, as opposed to a chemical or adhesive manner. The adhesion surface can be flat, or substantially flat, to provide a greater surface area to cling to the contact surface. Alternatively, the adhesion surface can be contoured, or can include indentations, to reduce the surface area to facilitate removal of the device from the contact surface.

The tacky block 10 can include external indicia 42 disposed on an outer surface of the upper body portion 30. The external indicia can include art work, a logo, an advertisement, an instruction, a brand, a trademark, etc. The indicia can be formed by printing on the outer surface, molded into the material of the outer surface, etc.

The tacky block 10 can be transparent or translucent. The upper body portion 30 can be transparent or translucent, and can be made from a translucent or transparent gel material. Internal indicia 40 can be disposed at the interface 32, behind the transparent or translucent upper body portion, and visible therethrough. Thus, the upper body portion can protect the internal indicia 40 from wear. In addition, the use of a gel material and the shape of the upper body portion can provide a unique visual appearance. Again, the internal indicia can be a logo, an advertisement, an instruction, a brand, a trademark, etc. Furthermore, the upper body portion 30 or gel can be flexible and elastic to provide a shock absorber effect to the laptop.

A material layer 34 can be disposed at the interface 32 between the upper body portion 30 and the base or grip portion 20. The material layer 34 can be nylon, TPU, polyester, or polypropylene sheet, or other synthetic material, and can be used to provide the indicia or graphic 40 that can be seen through the transparent upper body portion. The barrier 34 can be smaller than the attachment portion 20 and upper body portion 30 in order to leave a perimeter attachment portion 26 extending around a perimeter thereof so that the upper body portion can attach directly to the base portion.

Figure 3:
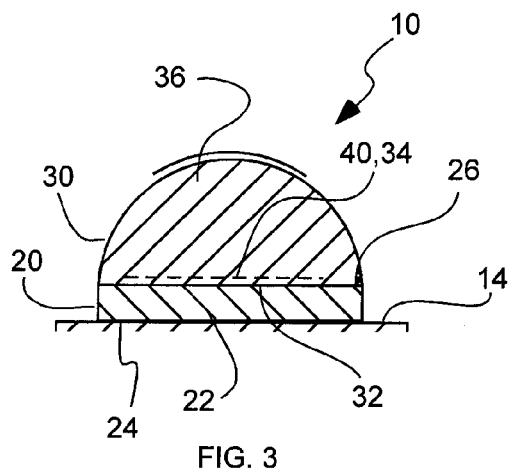
FIG. 3 is a cross-sectional view of the tack block of FIG. 1.
Figure 4:
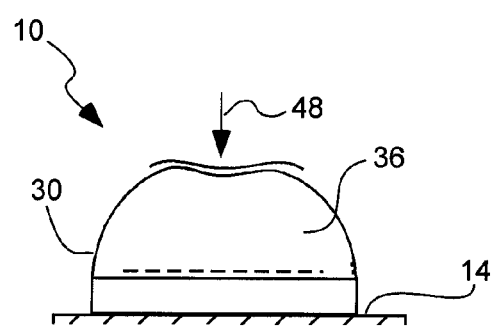
FIG. 4 is a side view of the tacky block of FIG. 1 shown disposed on a flat surface and being compressed by an applied force.
Figure 5:
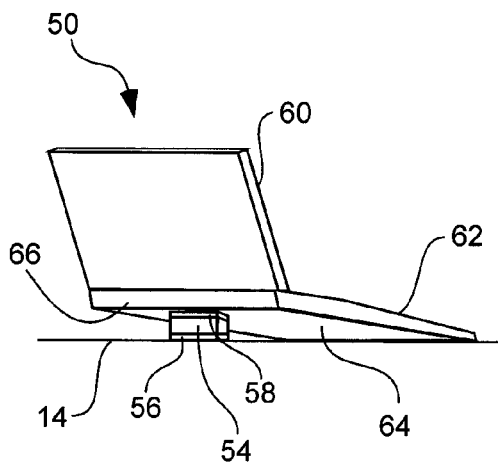
FIG. 5 is a perspective view of one embodiment of the present invention shown in operating contact with a laptop.

Many potential contact surfaces 14, such as a tabletop or desktop or laptop, have a finished surface configured to be aesthetically pleasing and luxurious. Such surfaces can be formed from a glass, metal, wood, plastic, ceramic or even a leather material, and can be expensive to replace or repair. As illustrated in FIG. 3, the base portion 20 of the tacky block 10 can be formed of, or can include, a material that provides a frictional or "tacky" quality that does not mar, chemically react with, or leave a residue on the contact surface to which it is adhered.

For example, the base portion 20 can include a molded polyurethane material 22 that forms the adhesion surface 24. It has been found that the polyurethane material typically clings to the contact surface 14 by forming a temporary non-chemical bond with the contact surface without chemically interacting with the material of the surface, including a similarly equipped tacky surface. Thus, the tacky block 10 or base portion can be removed from the contact surface without otherwise damaging or leaving behind any residue on the surface, and without damage to the tacky block itself. In this manner, the tacky block can be easily moved to any location the user desires. And because the block or base includes a polyurethane material, it can be easily cleaned with soap and water and still retain its tackiness, and is thus reusable.

The base or grip portion 20 also can have a planer configuration and can be used on planar surfaces. The tacky block 10 can be provided with a backing or release layer that prevents or resists the adhesion surface 24 from sticking or clinging to any wrapper or packaging of the tacky block. The release layer can include indicia thereon, such as instructions for use and care of the tacky block. The release layer can protrude beyond a perimeter of the base portion 20, such as with a tab, to facilitate removal of the release layer from the tacky block. A removable wrapper can be formed around the tacky block to protect the tacky block prior to use. The wrapper and backing layer can be removed prior to removably attached the tacky block on the contact surface 14.

The upper body portion 30 can include a polymer material, such as a polymer gel 36, forming a polymer body. The polymer body and/or polymer gel 36 can be elastic and coherent. Thus, the polymer body can elastically deform under normal conditions. The polymer body can be flexible and resilient, such that the body or gel can compress under an applied force (48 in FIG. 4), but can substantially return to its original configuration upon removal of the applied force. The polymer gel, or the polymer body 36, can have a freestanding, self-supported, three-dimensional shape. Thus, the polymer gel or polymer body can be consistent or solid enough to support or maintain its shape in a freestanding manner without a container. The three-dimensional shape can be any desired shape. The polymer gel 36 can be considered a solid material that is elastic and coherent, and thus flexible and capable of being deformed, but without being flowable. Thus, the polymer gel may have a sufficiently high molecular weight, and/or a sufficiently high viscosity, so that it is a non-flowable gel. In addition, the polymer gel can be considered as stable. Thus, the polymer gel can be bendable, but otherwise substantially maintains its form.

The polymer body or polymer gel 36 can be characterized as a polymeric material in the glass state with substantially no macroscopic flow. The polymeric material can have a glass transition temperature greater than approximately 110° F. The polymer gel can retain its gel-like characteristic over time, without drying or cracking, and without becoming hard or brittle. In one embodiment, the polymer gel can include a polyurethane material or can be a polyurethane gel. Alternatively, the polymer gel 36 can include silicone, diffused polyurethane, polyvinylchloride (PVC), ethylene vinyl acetate (EVA), thermoplastic polyurethane (TPU), a polymer encapsulation fragrance delivery platform (PolyIFF®), thermoplastic elastomer (TPE), polypropylene, ethylene/methacrylic acid (E/MAA) copolymer, in which the MAA groups have been partially neutralized with lithium ions (Surlyn® Dupont), etc.

As a general guideline, the polymer gel 36 can be formed of an elastomer such as, but not limited to, urethanes (including polyester and polyether polyol/isocyanate polymerization products), polyacrylates, polybutadienes, ethylene propylene elastomers, silicones, natural and synthetic rubbers, styrene/butadiene block copolymers, and the like. In some embodiments, the polymer gel can be formed of a thermoplastic elastomer. Thermoplastic elastomers can be block copolymers such as polyurethanes, polyamides, copolyesters, and styrene-butadiene-styrene polymers. Other thermoplastic elastomers can be elastomer/thermoplastic blends such as ethylene-propylene-diene monomer in an isotactic polypropylene phase or nitrile rubber dispersed in a PVC phase.

As used herein, "thermoplastic elastomer" refers to an elastomer which can be heated and processed like thermoplastic materials. Specifically, a thermoplastic elastomer can be heated to a melted or flowable state and then cooled, resulting in reformation of cross-linking and subsequent coherency without a substantial change in mechanical properties such as strength, flexural modulus, elastic modulus, etc. Additionally, "elastomeric polymer" and "elastomer" may be used interchangeably and refer to a polymeric material which can be mechanically deformed and upon release returns to an original shape. A coherent elastomer is non-flowable at or near room temperatures.

Also as used herein, "cling" and "clingy" refer to a property of a polymeric material which imparts adhesion to most surfaces without a loss of coherency in the polymer. Typically, removal of an elastomeric polymer body with a clingy attachment surface from a substrate does not result in substantial deformation, including temporary deformation, during flexing of the elastomer and/or attachment surface. A clingy attachment surface can be provided directly by the polymer body or can be provided in a separate layer as discussed in more detail herein. Adhesion can occur via mechanical adhesion or specific adhesion. Specific adhesion refers to adhesion dominated, or entirely characterized, by secondary intermolecular forces, i.e. non-covalent bonds, although some covalent bonds can be formed.

Referring now to FIGS. 5-8, various embodiments and methods are shown for elevating at least a portion of a laptop 60 relative to a support surface 14 to improve underbody ventilation. The method 50 illustrated in FIG. 5 includes providing at least one removable tacky block 54 having a tacky surface 56 that can be removably adhered to a contact surface. The tacky block can have any shape, including the rectangular or trapezoidal-shaped block 54 shown in FIG. 5 which can provide improved lateral stability in situations where the laptop is supported by a single tacky block. The method 50 further includes the operation of attaching the tacky block 54, by means of the tacky surface 56, to the contact surface, which can be either the laptop support surface 14 or the underside 64 of the laptop. In the method shown in FIG. 5, the tacky block is first attached to the support surface 14. The method further includes the operation of positioning the laptop on the support surface, such that the removable tacky block elevates a portion of the laptop 66 above the support surface. The tacky block can lift the back portion of the laptop so that the air gap between the support surface and the laptop is increased, allowing for increased air flow under the underside 64 of the laptop and improved cooling for the electronic components, especially the battery.

In another aspect of the present invention 50, the tacky block 54 can be configured with a second tacky surface 58 disposed on a surface opposite the first tacky surface 56, such that one tacky surface will contact the underside of the laptop 64 and the other tacky surface will contact the support surface 14 when the laptop 60 is positioned on the support surface. Thus, the tacky black can be simultaneously, removably adhered to both surfaces to better secure the laptop to the support surface. It will be appreciated that the block can be selectively positioned with respect to the laptop. In addition, the at least one removable tacky block can be an elongated bar or strip having a length of between 6-10 inches long, or greater than half the width of the laptop to equal the width.

Figure 6:
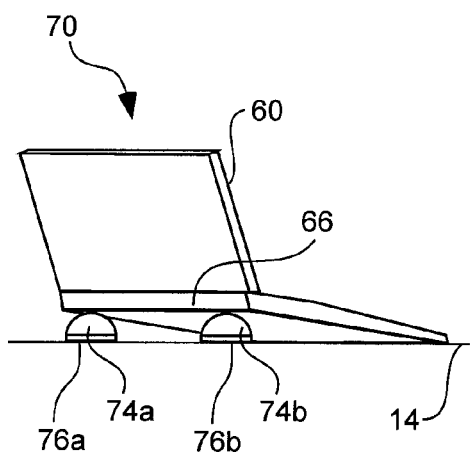
FIG. 6 is a perspective view of one embodiment of the present invention shown in operating contact with a laptop.

As illustrated in FIG. 6, one method 70 of the present invention can include providing a first removable block 74a and a second removable block 74b, wherein each of the first and second removable blocks has a tacky surface 76a and 76b respectively. The first and second removable blocks can be attached first to support surface 14, followed by the operation of positioning the laptop 60 on the support surface and over the pair of tacky blocks so that the two removable blocks elevate a portion of the laptop 66 above the support surface.

Figure 7:
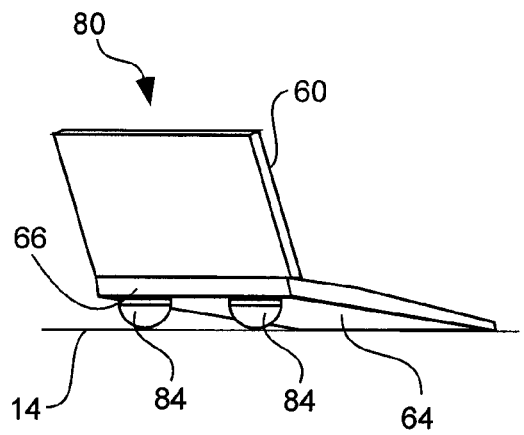
FIG. 7 is a perspective view of the embodiment of FIG. 6 shown in reverse operating contact with a laptop.

In another embodiment 80 of the present invention shown in FIG. 7, which is the reverse of the previous embodiment 70, a first set or pair of removable tacky blocks 84 is first attached to the underside surface 64 of the laptop 60. The laptop, with tacky blocks affixed, is then positioned on the support surface 14 such that the upper body portion of the tacky block is in physical contact with the support surface, and in the process elevating a portion of the laptop 66 above the support surface. This embodiment can be advantageous in that the elevated laptop can be moved from position to position on the support surface, or to another support surface altogether, without having to remove the tacky blocks from the contact surface 64. The embodiment can also be beneficial in that the support surface 14 does not have to be hard and flat, but can instead be soft, flexible or irregular without affecting the performance of the present invention.

Figure 8:
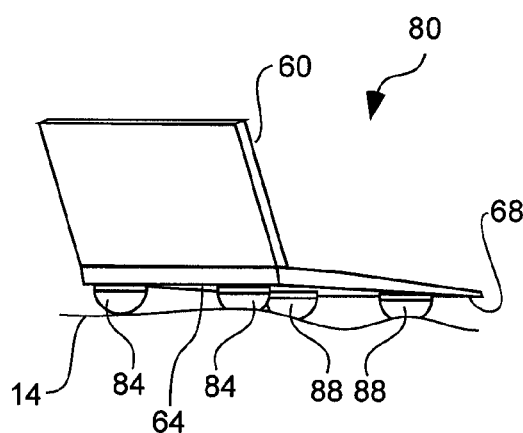
FIG. 8 is a perspective view of the embodiment of FIG. 6 shown in reverse, expanded operating contact with a laptop.

Illustrated in FIG. 8 is another aspect of the present invention 80 in which a second set or pair 88 of removable tacky blocks can be attached to the front portion 68 of the underside 64 of the laptop, followed by a positioning of the laptop 60 on the support surface so that all four corners of the laptop are elevated above the support surface 14. The first pair 84 and second pair 88 of the tacky blocks can be the same size, or one pair can be taller or larger than the other pair to pose the keyboard of the laptop at a forward-learning angle or a backward-leaning angle, according to the wishes and preferences of the user. Furthermore, this aspect of the present invention elevates the entire underside 64 of the laptop above the support surface, which can be advantageous when the support surface 14 is soft or pliable, such as when the laptop is positioned on a bed, pillow, couch, seat cushion or a carpeted floor, etc., and where otherwise the laptop could sink down into the surface and partially or completely block the cooling vents. This aspect of the present invention offers the additional benefit of raising the laptop to a more comfortable height when the user is seated on the same support surface as the laptop, such as could occur when using the laptop while seated on a bed, a bench, a couch, or even when working with the laptop on the floor.

Figure 9:
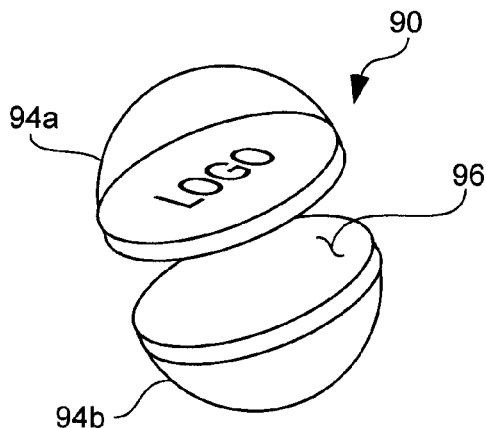
FIG. 9 is a perspective view of the embodiment of FIG. 7 shown removed from operating contact with a laptop.
Figure 10:
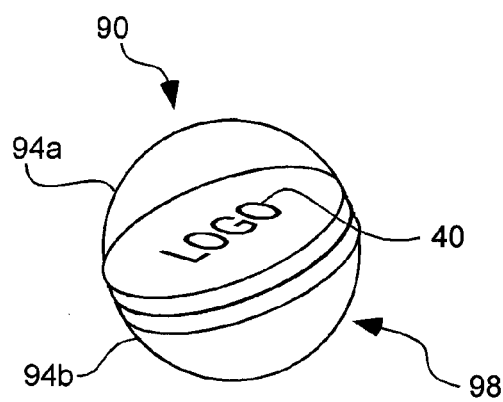
FIG. 10 is a perspective view of the embodiment of FIG. 7 shown in mutual protective contact for storage and transportation.

In another embodiment of the present invention 90, shown in FIGS. 9-10, a pair of tacky blocks 94a and 94b can be configured so that upon removal from the underside of the laptop or from the laptop support surface, the tacky surface 96 on each removable block can be removably attached to the tacky surface of the other block to substantially mutually cover the tacky surfaces when not in use, for instance, during storage and transportation. In addition, the pair of tacky blocks 94a and 94b can be initially provided attached together, as shown in FIG. 10, but separated prior to use. Mutually covering the tacky surfaces of each block 94 can advantageously protect the tacky surfaces 96 from foreign material such as dirt, grime and moisture, and to keep the tacky surfaces from coming into contact with or adhering to a non-desirable surface or object when not in use. Even though the tacky surface can be easily cleaned and washed with soapy water in one embodiment of the present invention, it can be highly beneficial to keep the tacky surfaces clean between washings to prevent any dirt or other foreign objects from becoming trapped between the tacky surface and the contact surface, and possibly scratch or damage the contact surface.

As further illustrated in FIG. 10, a pair of tacky blocks 94a and 94b can be removably attached to each other to form a single object 98. The single object can assume any shape, including the shape of the sphere shown in FIG. 10. The shape of the single object does not have to be symmetrical, however, and the two tacky blocks can combine to form any irregular single object. Moreover, three or more tacky blocks can also be combined to form a single object. So long as the tacky surfaces 96 are configured with substantially the same size and shape so that they mutually cover each other when removably combined for storage, and so long as the vertical dimensions of the individual tacky blocks 94 are the substantially the same to elevate the various portions of the laptop to the same height when placed in use, the number of potential shapes formed by removably combining multiple tacky blocks into a single object is only limited by the imagination.

The single object 98 formed by combining multiple tacky blocks can serve a secondary purpose. For instance, the single object can be colored or provided with graphics for use as a decoration in the office, home or dorm room. The single object can be configured with the shape into a popular sports ball, such as an oblong football or a multi-faceted soccer ball and used as a toy or recreational device. The single object can also take advantage of the flexible, deformable characteristics of the polymer body to function as a squeezable hand exerciser device.

Referring to both FIG. 1 and FIG. 10, the tacky block of the present invention, either when separated as an individual tacky block 10 or combined with another tacky block to form a single object 98, can be utilized as a promotional device to promote products or services. For example, the indicia 40 and/or 42 can include a logo or trademark for a product, service, business, etc. A method for utilizing the tacky block and/or for promoting includes providing such a tacky block with indicia on or in the tacky block that is indicative of the promotion. Such a tacky block can be given away as a promotional item. The tacky block can be used in a public location, such as at school, at work, at a civic, sporting or entertainment event, in an internet café, or in any public location where it will be frequently visible to the user as well as to others passersby.

Figure 11:
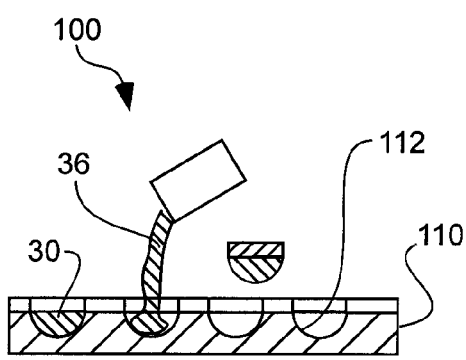
FIGS. 11 and 12 are schematic views of making the tacky block of FIG. 1.
Figure 12:
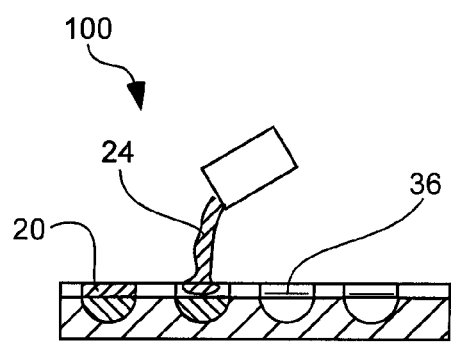

Referring to FIGS. 11 and 12, a method 100 for providing a tacky block is shown. The method includes forming the upper body portion 30 into a desired shape. For example, a material of the upper body portion 30, such as the polymer gel 36, can be poured in a mold 110 with cavities 112 formed in a desired shape. In addition, the tacky block can also be provided with a base or grip portion 20. A material 24 of the base or grip portion 20 can be poured in over the material of the upper body portion. Pouring one material onto the other can cause the two materials to bond or adhere to one another. Alternatively, the two portions can be separately molded and attached with adhesive. The material layer 34 can be positioned prior to pouring one material onto the other. In addition, the device, or portions thereof, can be made by injection molding.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A method for elevating at least a portion of a computer relative to a support surface, comprising:
   obtaining at least one removable block having at least one tacky surface;
   removably attaching the at least one tacky surface to the support surface or an underside of the computer by mechanical or specific adhesion, and
   positioning the computer on the support surface, such that the removable block elevates the at least a portion of the computer above the support surface.

2. The method of claim 1, wherein obtaining at least one removable block further comprises obtaining a first and a second removable blocks, wherein the first and second removable blocks each has at least one tacky surface.

3. The method of claim 2, further comprising configuring the tacky surfaces on the first and second removable blocks to removably attach to the tacky surface of the other block to substantially mutually cover the tacky surfaces.

4. The method of claim 2, further comprising removably attaching the first and second removable blocks to form a single object.

5. The method of claim 4, wherein forming a single object further comprises forming a sphere.

6. The method of claim 1, wherein obtaining at least one removable block further comprises obtaining a pad carrying a coherent elastomeric polymer body, the pad having the tacky.

7. The method of claim 6, wherein obtaining a pad carrying a coherent elastomeric polymer body further comprises obtaining a barrier disposed between the polymer body and the pad, being smaller than the polymer body and the pad such that a perimeter of the polymer body contacts a perimeter of the pad.

8. The method of claim 7; further comprising obtaining the pad having indicia formed thereon and the polymer body being substantially translucent such that the indicia is visible through the polymer body.

9. The method of claim 1, further comprising obtaining a removable block having a first tacky surface on one side of the removable block and a second tacky surface on the opposite side of the removable block.

10. The method of claim 9, wherein positioning the computer on the laptop support surface further comprises removably attaching the first tacky surface to the support surface by mechanical or specific adhesion and the second tacky surface to the underside of the computer by mechanical or specific adhesion.

11. The method of claim 1, further comprising;
   removing the at least one block from the support surface or the underside of the computer.

12. A method for elevating at least a portion of a computer relative to a support surface, comprising:
   obtaining a pair of removable blocks removably attached to each other to form a single object, each having at least one tacky surface removably attached to the tacky surface of the other block by mechanical or specific adhesion to substantially mutually cover the tacky surfaces;
   separating the pair of removably blocks from one another;
   removably attaching the at least one tacky surface of each block to the support surface or an underside of the computer by mechanical or specific adhesion, and
   positioning the computer on the support surface, such that the pair of removable blocks elevate the at least a portion of the computer above the support surface.

13. The method of claim 11, further comprising;
   removing the pair of blocks from the support surface or the underside of the computer; and
   removably attaching the at least one tacky surface of one block to the at least one tacky surface of the other block by mechanical or specific adhesion to substantially mutually cover the tacky surfaces and to form the single object.

14. The method of claim 12, wherein forming a single object further comprises forming a sphere.

15. The method of claim 12, wherein obtaining a pair of removable blocks further comprises obtaining blocks that each have a pad carrying a coherent elastomeric polymer body, the pad having the tacky.

16. The method of claim 15, further comprising obtaining the pad having indicia formed between the pad and polymer body, the polymer body being substantially translucent such that the indicia is visible through the polymer body.

17. A system for elevating at least a portion of a computer relative to a support surface, comprising:
   a pair of removable blocks each having at least one tacky surface;
   the pair of blocks having at least two configurations, including:
      a stored configuration in which the pair of blocks are attached to each other by mechanical or specific adhesion to form a single object with the at least one tacky surface of each block removably attached to the tacky surface of the other block to substantially mutually cover the tacky surfaces; and
      a use configuration in which the pair of blocks are separated from one another and the at least one tacky surface of each block is removably attached to the support surface or an underside of the computer by mechanical or specific adhesion such that the pair of removable blocks elevate the at least a portion of the computer above the support surface.

18. The system of claim 17, wherein the single object is a sphere.

19. The system of claim 17, wherein each block further includes a pad carrying a coherent elastomeric polymer body, the pad having the tacky surface.

20. The system of claim 19, further comprising a barrier disposed between the polymer body and the pad, being smaller than the polymer body and the pad such that a perimeter of the polymer body contacts a perimeter of the pad.

21. The system of claim 19, further comprising indicia disposed between the pad and the polymer body, and the polymer body being substantially translucent such that the indicia is visible through the polymer body.

22. A method for elevating at least a portion of a computer relative to a support surface, comprising:
   obtaining at least one removable block having a pad carrying a coherent elastomeric polymer body, the pad having at least one tacky surface;
   removably attaching the at least one tacky surface to the support surface or an underside of the computer by mechanical or specific adhesion, and
   positioning the computer on the support surface, such that the removable block elevates the at least a portion of the computer above the support surface.

23. The method of claim 22, wherein obtaining at least one removable block further comprises obtaining a first and a second removable blocks, wherein the first and second removable blocks each has at least one tacky surface.

24. The method of claim 23, further comprising configuring the tacky surfaces on the first and second removable blocks to removably attach to the tacky surface of the other block to substantially mutually cover the tacky surfaces.

25. The method of claim 23, further comprising removably attaching the first and second removable blocks to form a single object.

26. The method of claim 25, wherein forming a single object further comprises forming a sphere.

27. The method of claim 22, further comprising obtaining a removable block having a first tacky surface on one side of the removable block and a second tacky surface on the opposite side of the removable block.

28. The method of claim 27, wherein positioning the computer on the support surface further comprises removably adhering the first tacky surface to the support surface and the second tacky surface to the underside of the computer.

29. A system for elevating at least a portion of a computer relative to a support surface, comprising:
- a pair of removable blocks each having at least one tacky surface;
- the pair of blocks having at least two configurations, including:
  - a stored configuration in which the pair of blocks are attached to each other to form a single object with the at least one tacky surface of each block removably attached to the tacky surface of the other block to substantially mutually cover the tacky surfaces; and
  - a use configuration in which the pair of blocks are separated from one another and the at least one tacky surface of each block is removably attached to the support surface or an underside of the computer such that the pair of removable blocks elevate the at least a portion of the computer above the support surface; and
- each block further including a pad carrying a coherent elastomeric polymer body, the pad having the at least one tacky surface configured to cling to the support surface or the underside of the computer by mechanical or specific adhesion.

30. The system of claim 29, further comprising a barrier disposed between the polymer body and the pad, being smaller than the polymer body and the pad such that a perimeter of the polymer body contacts a perimeter of the pad.

31. The system of claim 29, further comprising indicia disposed between the pad and the polymer body, and the polymer body being substantially translucent such that the indicia is visible through the polymer body.

* * * * *